US010471859B2

(12) United States Patent
Harrison, III et al.

(10) Patent No.: US 10,471,859 B2
(45) Date of Patent: Nov. 12, 2019

(54) VEHICLE SEAT WITH STOWABLE SEAT BOTTOM

(71) Applicant: Mahindra N.A. Tech Center, Troy, MI (US)

(72) Inventors: Albert W. Harrison, III, Detroit, MI (US); John P. Pacella, Rochester Hills, MI (US); Lowell F. Kiester, Jr., Grand Blanc, MI (US)

(73) Assignee: MAHINDRA N.A. TECH CENTER, Auburn Hills, MI (US)

( * ) Notice: Subject to any disclaimer, the term of this patent is extended or adjusted under 35 U.S.C. 154(b) by 0 days.

(21) Appl. No.: 15/816,324

(22) Filed: Nov. 17, 2017

(65) Prior Publication Data

US 2019/0152357 A1 May 23, 2019

(51) Int. Cl.
*B60N 2/30* (2006.01)

(52) U.S. Cl.
CPC ......... *B60N 2/3088* (2013.01); *B60N 2/3065* (2013.01)

(58) Field of Classification Search
CPC .... B60N 2/3043; B60N 2/305; B60N 2/3079; B60N 2/3088; B60N 2/3065
USPC ......... 296/65.05; 297/14, 15, 331, 334, 225, 297/336
See application file for complete search history.

(56) References Cited

U.S. PATENT DOCUMENTS

| | | | | |
|---|---|---|---|---|
| 3,097,881 A * | 7/1963 | Aguilar | ................ | B60N 2/3013 296/66 |
| 3,822,911 A * | 7/1974 | Radke | ................... | B60N 2/305 296/37.15 |
| 7,000,968 B2 * | 2/2006 | Welch | ...................... | B60J 5/101 296/66 |
| 7,300,090 B2 * | 11/2007 | Rana | .................... | B60N 2/3075 296/65.05 |
| 7,712,815 B2 * | 5/2010 | Kowalski | ................ | B60N 2/24 296/65.01 |

* cited by examiner

*Primary Examiner* — Cassandra Davis
(74) *Attorney, Agent, or Firm* — Harness, Dickey & Pierce, P.L.C.

(57) ABSTRACT

A vehicle seat assembly for a vehicle having a cargo area bounded by a floor and at least one wall is provided along with a method of operation. The vehicle seat assembly comprises a seat back, a seat base, and a linkage assembly. The seat back of the vehicle seat assembly mounts to the wall and the linkage assembly mounts to the floor. The seat bottom is mounted to the linkage assembly and is moveable between stowed and deployed positions. When the seat bottom is in the deployed position, the seat bottom defines a deployed seat bottom plane. When the seat bottom is in the stowed position, the seat bottom is positioned below the deployed seat bottom plane. The seat bottom is separate from the seat back and is spaced apart from the seat back when the seat bottom is in the stowed position.

18 Claims, 6 Drawing Sheets

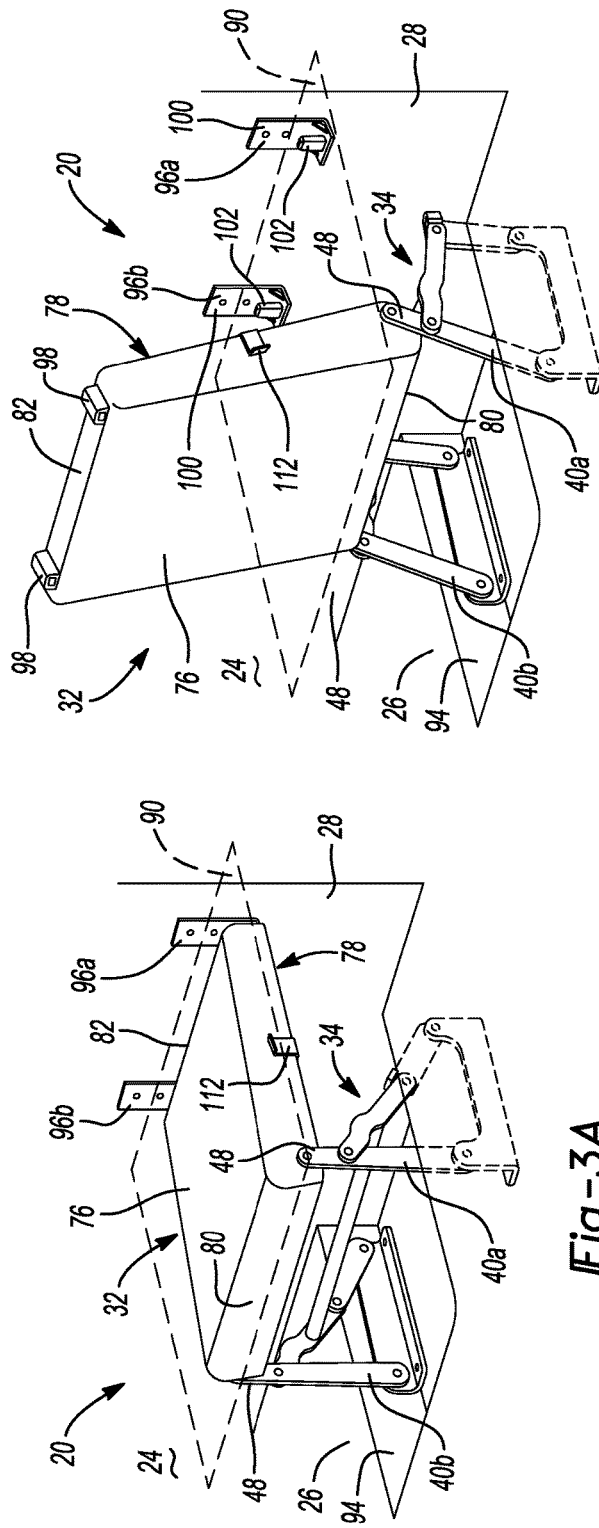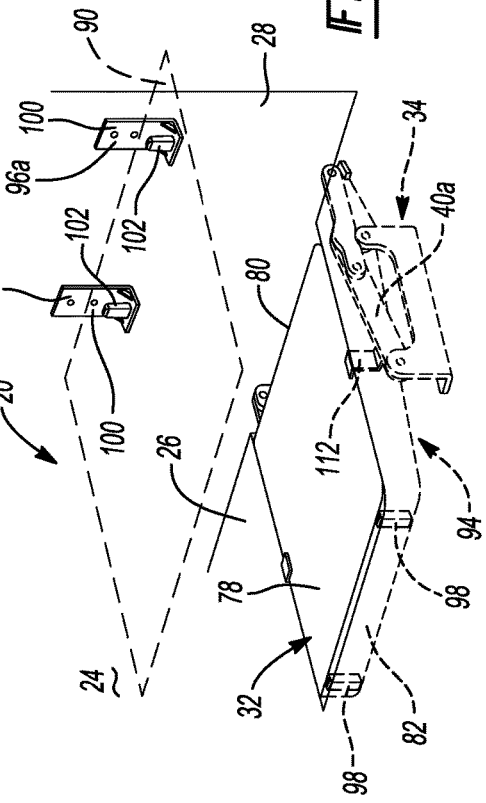

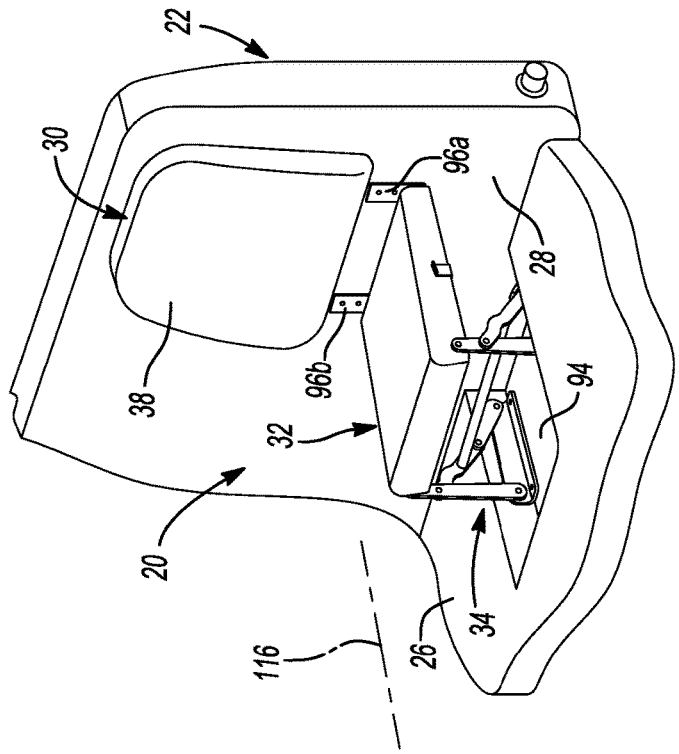
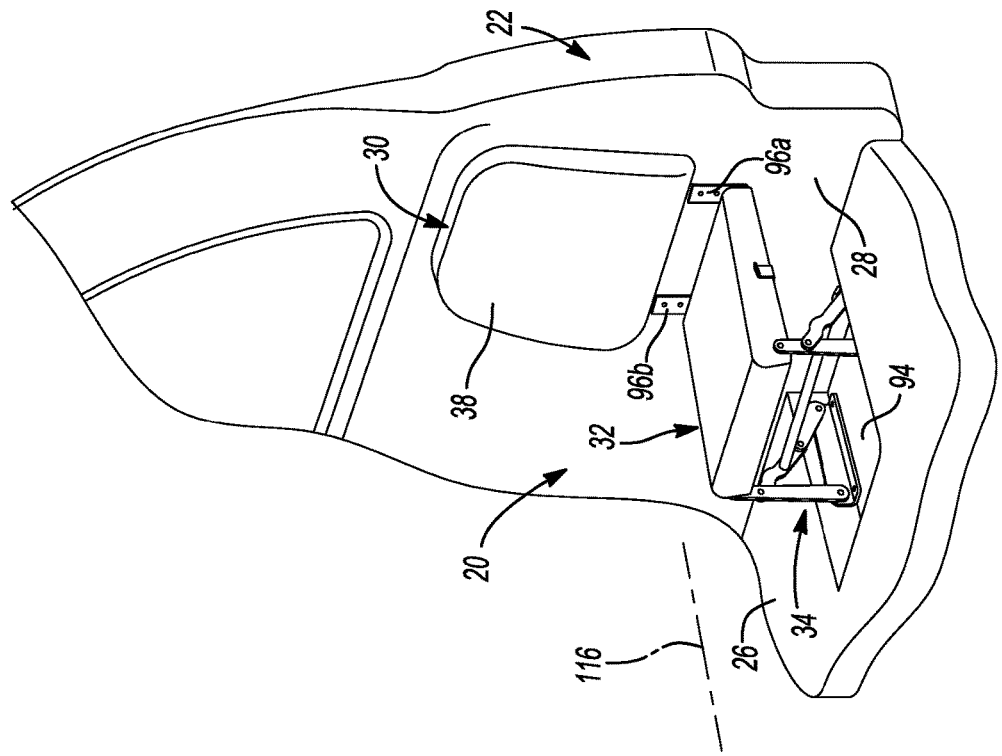

VEHICLE SEAT WITH STOWABLE SEAT BOTTOM

FIELD

The present disclosure generally relates to stowable vehicle seat assemblies for vehicles having a cargo area and to methods of stowing and deploying the same.

BACKGROUND

This section provides background information related to the present disclosure which is not necessarily prior art.

Many of today's vehicles include cargo areas that are equipped with stowable vehicle seats. These stowable vehicle seats allow the cargo area of the vehicle to double as a passenger compartment and therefore give the vehicle greater flexibility and a higher occupant capacity. There are generally two types of stowable vehicle seats. In one known configuration, the stowable vehicle seat includes a seat back and a seat bottom that fold together and drop into the floor of the cargo area. In this configuration, the seat back and the seat bottom are connected and are positioned in close proximity to each other when stowed. One disadvantage of this configuration is that it requires a deep pocket in the floor of the cargo area because both the seat bottom and the seat back drop into the floor. Room for both the seat bottom and the seat back in the floor is not always available due to the mechanical configuration of the vehicle. For example, the frame, suspension, drivetrain, fuel tank, exhaust system, and other components of the vehicle may preclude a deep floor pocket. In addition, the seat bottom and the seat back are often made as thin as possible so that they fit into the floor of the cargo area. This often results in a small and uncomfortable vehicle seat that has minimal cushioning. Another known configuration is to mount the seat back against a wall of the vehicle and provide a seat bottom that folds up against the seat back. In accordance with this configuration, the seat bottom is substantially vertical in the stowed position and is arranged in close proximity to the seat back. One of the drawbacks associated with this configuration is that the seat bottom still takes up considerable room within the cargo area and therefore decreases the size of the cargo area. Accordingly, improved stowable vehicle seats are needed.

SUMMARY

This section provides a general summary of the disclosure and is not a comprehensive disclosure of its full scope or all of its features.

The present disclosure describes a vehicle seat assembly for a vehicle having a cargo area. The cargo area of the vehicle is generally bounded by a floor and at least one wall. The vehicle seat assembly comprises a seat back, a seat bottom, and a linkage assembly. The seat back of the vehicle seat assembly mounts on the wall of the cargo area and the linkage assembly mounts to the floor of the cargo area. The seat bottom is mounted to the linkage assembly and is moveable between a stowed position and a deployed position. When the seat bottom is in the deployed position, the seat bottom defines a deployed seat bottom plane. When the seat bottom is in the stowed position, the seat bottom is positioned below the deployed seat bottom plane. The seat bottom is separate from the seat back and is spaced apart from the seat back when the seat bottom is in the stowed position.

In accordance with another aspect of the subject disclosure, a method of operating the vehicle seat assembly described herein is provided. The method begins with the step of positioning the seat bottom in a deployed position with the occupant support surface of the seat bottom facing up and the rear seat bottom end located adjacent to the wall of the cargo area. The method continues with the steps of rotating an upper link assembly of the linkage assembly up towards the underside surface of the seat bottom and rotating the seat bottom relative to first and second primary support links of the linkage assembly until the underside surface of the seat bottom faces up and the front seat bottom end is closer to the wall of the cargo area than the rear seat bottom end. The method continues with the step of lowering the seat bottom into a depression in the floor of the cargo area to place the seat bottom in a stowed position where the underside surface of the seat bottom forms part of the floor of the cargo area.

Advantageously, the vehicle seat assembly of the present disclosure helps maximize available cargo space in the cargo area and particularly the space along the floor of the cargo area because the seat bottom folds into the floor. Because the seat bottom becomes part of the floor of the cargo area when the seat bottom is in the stowed position, articles can be easily loaded into the cargo area and un-loaded from the cargo area. At the same time, the requirement for a thin seat bottom and seat back is obviated because the seat bottom and the seat back are not folded together into the floor of the cargo area when stowed like in some known vehicle seat designs. Accordingly, the thickness of the padding/cushioning of the seat bottom and seat back does not need to be compromised for compact folding and therefore a more comfortable vehicle seat is provided. Additionally, operation of the vehicle seat assembly described herein is highly intuitive, easy to operate with just a few physical motions, and requires little physical effort. Finally, the vehicle seat assembly of the subject disclosure can easily be adapted for a variety of different vehicles, various loading requirements, and transverse (side-facing) or longitudinal (forward-facing) mounting positions.

BRIEF DESCRIPTION OF THE DRAWINGS

Other advantages of the disclosed vehicle seat assembly and associated method will be readily appreciated, as the same becomes better understood by reference to the following detailed description when considered in connection with the accompanying drawings wherein:

FIG. 3A is a front perspective view of the seat bottom and linkage assembly of the exemplary vehicle seat assembly illustrated in FIG. 1 where the seat bottom is shown in a deployed position;

FIG. 3B is a front perspective view of the seat bottom and linkage assembly of the exemplary vehicle seat assembly illustrated in FIG. 1 where the seat bottom is being rotated from the deployed position towards a stowed position;

FIG. 3C is a front perspective view of the seat bottom and linkage assembly of the exemplary vehicle seat assembly illustrated in FIG. 1 where the seat bottom is shown in the stowed position;

FIG. 7 is a front perspective view of the exemplary vehicle seat assembly illustrated in FIG. 1 where the seat back is mounted to a rear lift gate of a vehicle; and FIG. 8 is a front perspective view of the exemplary vehicle seat assembly illustrated in FIG. 1 where the seat back is mounted to a rear tail gate of a vehicle.

DETAILED DESCRIPTION

Figure 1:
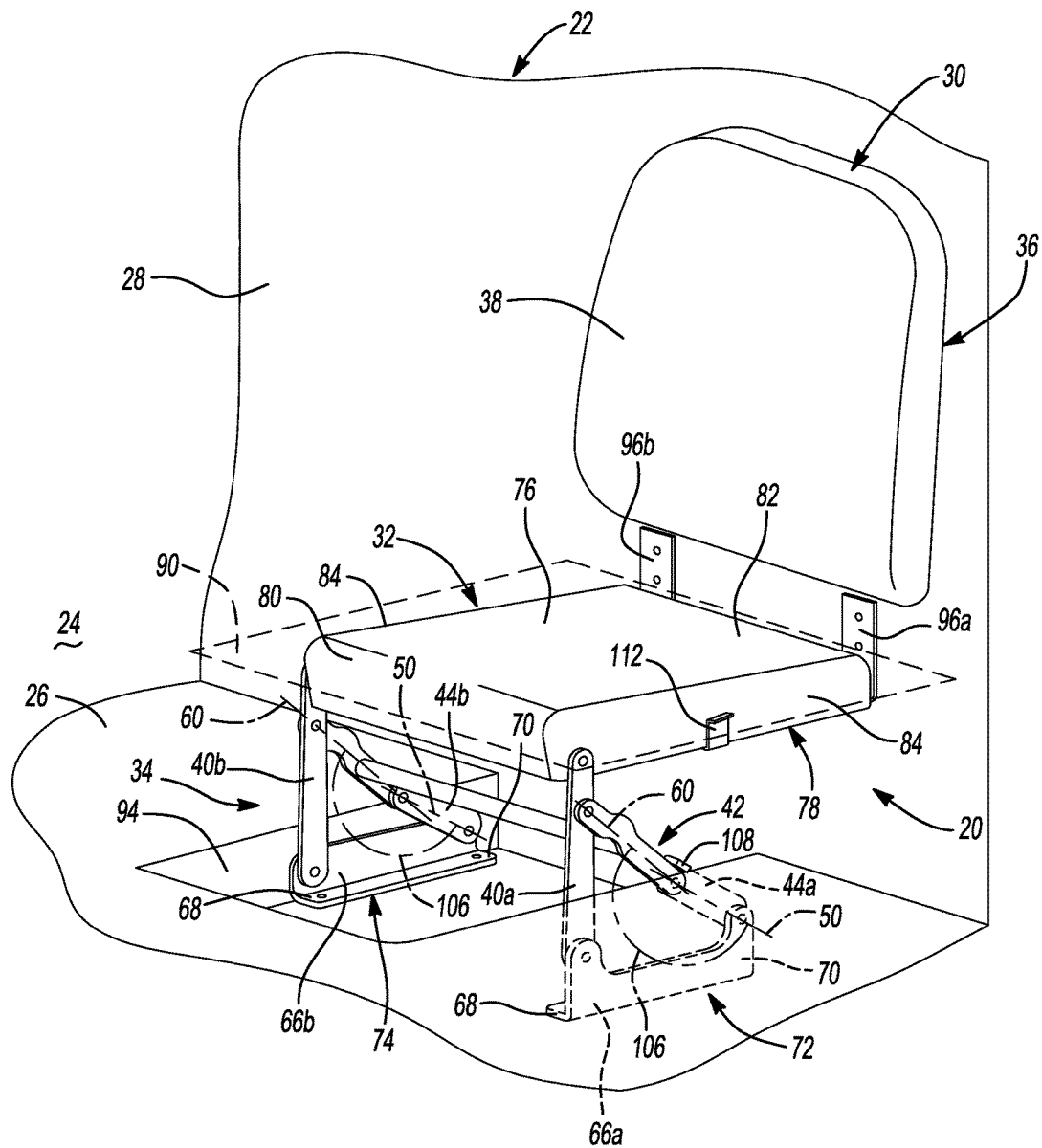
FIG. 1 is a front perspective view of an exemplary vehicle seat assembly that is constructed in accordance with the subject disclosure.

Referring to the Figures, wherein like numerals indicate corresponding parts throughout the several views, a vehicle seat assembly 20 is disclosed for a vehicle 22 having a cargo area 24 bounded by a floor 26 and a wall 28.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
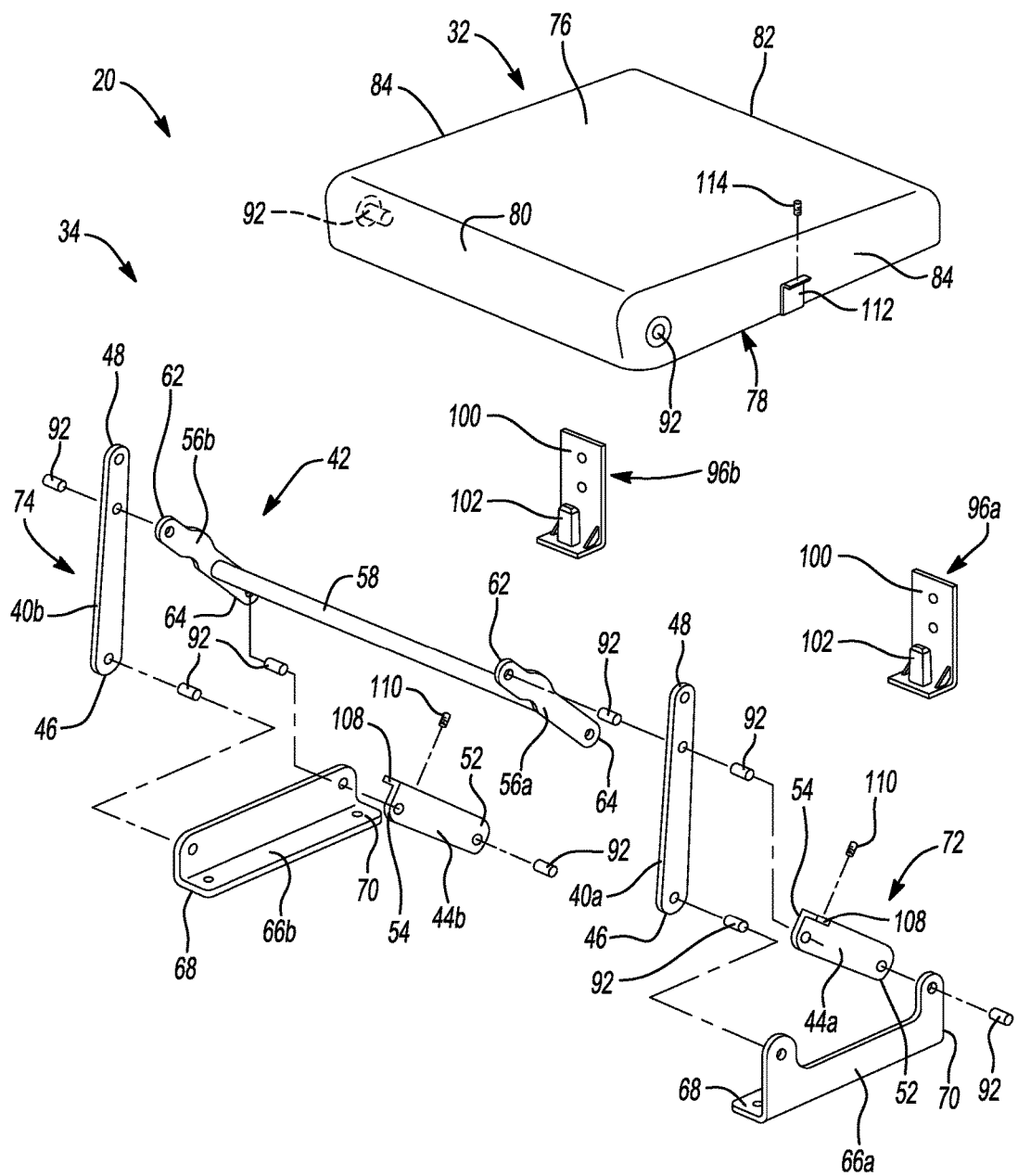
FIG. 2 is a front exploded, perspective view of the seat bottom and linkage assembly of the exemplary vehicle seat assembly illustrated in FIG. 1.

As shown in FIGS. 1 and 2, the vehicle seat assembly 20 includes a seat back 30, a seat bottom 32, and a linkage assembly 34. The seat back 30 is designed to be mounted to the wall 28 of the cargo area 24. More particularly, the seat back 30 has a backside surface 36 that faces the wall 28 of the cargo area 24 when the seat back 30 is installed in the vehicle 22. The seat back 30 also has an occupant facing surface 38 that is opposite the backside surface 36. When an occupant is seated, the occupant facing surface 38 of the seat back 30 faces and supports the occupant's back.

The linkage assembly 34 is mounted to the floor 26 of the cargo area 24. The linkage assembly 34 includes first and second primary support links 40a, 40b, an upper link assembly 42, and first and second lower links 44a, 44b. The upper link assembly 42 is pivotally connected to the first and second primary support links 40a, 40b. The first and second lower links 44a, 44b are pivotally connected to the upper link assembly 42. Each of the first and second primary support links 40a, 40b extend between a floor-side end 46 and a seat-side end 48. Each of the first and second lower links 44a, 44b has a lower link axis 50. Each of the first and second lower links 44a, 44b extends along its respective lower link axis 50 between a bracket-side end 52 and a link-side end 54. The upper link assembly 42 includes first and second upper link members 56a, 56b and a torque tube 58 that extends between the first and second upper link members 56a, 56b. The torque tube 58 is fixed to the first and second upper link members 56a, 56b and therefore couples rotation of the first and second upper link members 56a, 56b so that the first and second upper link members 56a, 56b rotate in phase with each other during movement of the linkage assembly 34.

Each of the first and second upper link members 56a, 56b has an upper link axis 60. Each of the first and second upper link members 56a, 56b extends along its respective upper link axis 60 between a first end 62 and a second end 64. The first end 62 of the first upper link member 56a is pivotally connected to the first primary support link 40a between the floor-side end 46 and the seat-side end 48 of the first primary support link 40a. The first end 62 of the second upper link member 56b is pivotally connected to the second primary support link 40b between the floor-side end 46 and the seat-side end 48 of the second primary support link 40b. The second end 64 of the first upper link member 56a is pivotally connected to the link-side end 54 of the first lower link 44a and the second end 64 of the second upper link member 56b is pivotally connected to the link-side end 54 of the second lower link 44b.

The vehicle seat assembly 20 includes first and second floor brackets 66a, 66b that connect the linkage assembly 34 to the floor 26 of the cargo area 24. The first and second floor brackets 66a, 66b can be attached to the floor 26 of the cargo area 24 in a number of different ways. For example and without limitation, the first and second floor brackets 66a, 66b may be attached to the floor 26 of the cargo area 24 using welding, epoxy, glue or one or more fasteners such as screws, bolts, or rivets. Alternatively, the first and second floor brackets 66a, 66b may be integrated into the floor 26 of the cargo area 24. Each of the first and second floor brackets 66a, 66b extends between an inboard end 68 and an outboard end 70. The first and second floor brackets 66a, 66b are mounted to the floor 26 of the cargo area 24 with the outboard end 70 of the first and second floor brackets 66a, 66b positioned closer to the wall 28 of the cargo area 24 than the inboard end 68 of the first and second floor brackets 66a, 66b.

The floor-side end 46 of the first primary support link 40a is pivotally connected to the inboard end 68 of the first floor bracket 66a and the bracket-side end 52 of the first lower link 44a is pivotally connected to the outboard end 70 of the first floor bracket 66a. The floor-side end 46 of the second primary support link 40b is pivotally connected to the inboard end 68 of the second floor bracket 66b and the bracket-side end 52 of the second lower link 44b is pivotally connected to the outboard end 70 of the second floor bracket 66b. Accordingly, the first primary support link 40a, the first upper link member 56a, the first lower link 44a, and the first floor bracket 66a collectively form a first four-bar linkage 72. Similarly, the second primary support link 40b, the second upper link member 56b, the second lower link 44b, and the second floor bracket 66b collectively form a second four-bar linkage 74.

Figure 4:
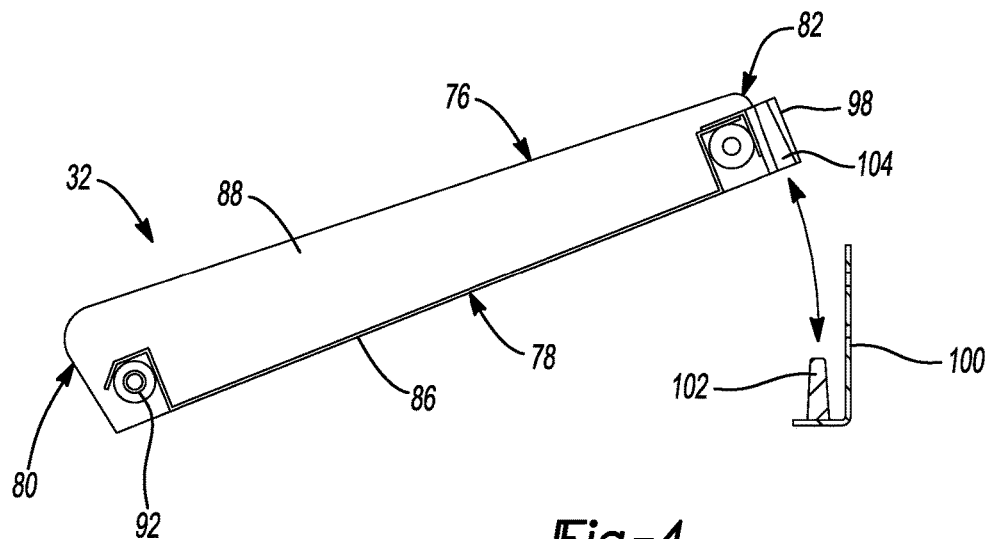
FIG. 4 is a side elevation view of the seat bottom and rear seat bottom support assemblies of the exemplary vehicle seat assembly illustrated in FIG. 1.

As shown in FIGS. 3A-3C, the seat bottom 32 of the vehicle seat assembly 20 is mounted to the linkage assembly 34 and is moveable between a deployed position (FIG. 3A) and a stowed position (FIG. 3C). The seat bottom 32 includes an occupant support surface 76, an underside surface 78 opposite the occupant support surface 76, a front seat bottom end 80, a rear seat bottom end 82, and a pair of seat bottom sides 84 that extend between the front seat bottom end 80 and the rear seat bottom end 82. Although other configurations are possible, the seat bottom 32 illustrated in FIG. 4 includes a frame 86 and a seat bottom cushion 88 that is supported by the frame 86. It should be appreciated that the seat back 30 may have a similar cushion-on-frame construction. The seat bottom cushion 88 defines the occupant support surface 76. As shown in FIGS. 1 and 3A, the occupant support surface 76 of the seat bottom 32, which faces and supports the occupant's thighs when the occupant is seated, defines a deployed seat bottom plane 90 when the seat bottom 32 is in the deployed position. The seat-side ends 48 of the first and second primary support links 40a, 40b are pivotally connected to the frame 86 at the pair of seat bottom sides 84 and adjacent to the front seat bottom end 80. Accordingly, the linkage assembly 34 moves with the seat bottom 32 as the seat moves between the deployed position and the stowed position (FIG. 3B). In the stowed position (FIG. 3C), the entire seat bottom 32 is positioned below the deployed seat bottom plane 90.

With reference to FIG. 2, hinge assemblies 92 pivotally connect the first and second upper link members 56a, 56b to the first and second primary support links 40a, 40b, the first and second lower links 44a, 44b to the first and second upper link members 56a, 56b, the first and second primary support links 40a, 40b to the first and second floor brackets 66a, 66b, the first and second lower links 44a, 44b to the first and second floor brackets 66a, 66b, and the first and second primary support links 40a, 40b to the frame 86 of the seat bottom 32. It should be appreciated that the hinge assemblies 92 may take a variety of different forms. For example only and without limitation, each of the hinge assemblies 92 may include a rivet, a bushing, and a washer. By way of non-limiting example, the bushing may be made of a plastic material and the washer may be made of steel. Although other materials may be used, the upper link assembly 42, the first and second primary support links 40a, 40b, the first and second lower links 44a, 44b and the first and second floor brackets 66a, 66b may be made of metal or an engineering plastic.

As shown in FIG. 1, the deployed seat bottom plane 90 is arranged transverse (i.e. at an angle) to the wall 28 of the cargo area 24 and is substantially parallel to and spaced above the floor 26 of the cargo area 24. The seat back 30 of the vehicle seat assembly 20 is positioned above the deployed seat bottom plane 90 when the seat bottom 32 is in the deployed position (FIG. 3A) and when the seat bottom 32 is in the stowed position (FIG. 3C). For example, the seat back 30 may be fixed to the wall 28 of the cargo area 24 such that the seat back 30 remains stationary when the seat bottom 32 moves between the deployed and stowed positions (FIG. 3B). Alternatively, the seat back 30 may be designed to pivot or recline relative to the wall 28 of the cargo area 24, but even in this configuration, the pivoting/reclining motion of the seat back 30 is independent of the movement of the seat bottom 32 and the seat back 30 will not pivot or recline as a result of the seat bottom 32 moving between the deployed position and the stowed position (FIG. 3B).

As shown in FIG. 3C, at least part of the seat bottom 32 is received in a depression 94 in the floor 26 of the cargo area 24 when the seat bottom 32 is in the stowed position. Preferably, the underside surface 78 of the seat bottom 32 is positioned in-plane (i.e., flush) with the floor 26 of the cargo area 24 when the seat bottom 32 is in the stowed position such that the underside surface 78 of the seat bottom 32 forms part of the floor 26 of the cargo area 24 when the seat bottom 32 is in the stowed position. Although other configurations are possible, the underside surface 78 of the seat bottom 32 may be made of a substantially rigid material such that it can form a load bearing part of the floor 26 of the cargo area 24.

The seat bottom 32 is separate from the seat back 30. This means that the seat back 30 is not supported by or directly connected to the seat bottom 32 or the linkage assembly 34. As a result, the seat bottom 32 is spaced apart from the seat back 30 when the seat bottom 32 is in the stowed position (FIG. 3C). In the deployed position (FIG. 3A), the occupant support surface 76 of the seat bottom 32 faces up and the rear seat bottom end 82 is located adjacent to the wall 28 of the cargo area 24 and the seat back 30. When the seat bottom 32 moves from the deployed position to the stowed position (FIG. 3B), the seat bottom 32 rotates substantially 180 degrees about the seat-side end 48 of the first and second primary support links 40a, 40b such that the front seat bottom end 80 is positioned closer to the wall 28 of the cargo area 24 than the rear seat bottom end 82. As a result, the seat bottom 32 flips over when the seat bottom 32 moves from the deployed position to the stowed position such that the underside surface 78 of the seat bottom 32 faces up when the seat bottom 32 is in the stowed position (FIG. 3C).

With reference to FIGS. 1-5, the vehicle seat assembly 20 may include first and second rear seat bottom support assemblies 96a, 96b that releasably connect the rear seat bottom end 82 to the wall 28 of the cargo area 24. In the illustrated embodiment, each of the first and second rear seat bottom support assemblies 96a, 96b includes a receiver 98 and a wall bracket 100. The receiver 98 is positioned along the rear seat bottom end 82 and is connected to the frame 86. The wall bracket 100 is mounted to the wall 28 of the cargo area 24 below the seat back 30. A bayonet 102 extends upwardly from the wall bracket 100 toward the seat back 30. The receiver 98 has a receptacle 104 that receives the bayonet 102 when the seat bottom 32 is in the deployed position. It should be appreciated that other configurations for the first and second rear seat bottom support assemblies 96a, 96b are possible. For example, each of the first and second rear seat bottom support assemblies 96a, 96b may include a latch mechanism (not shown). Additionally, it should be appreciated that a single rear seat bottom support assembly may be used.

Figure 5:
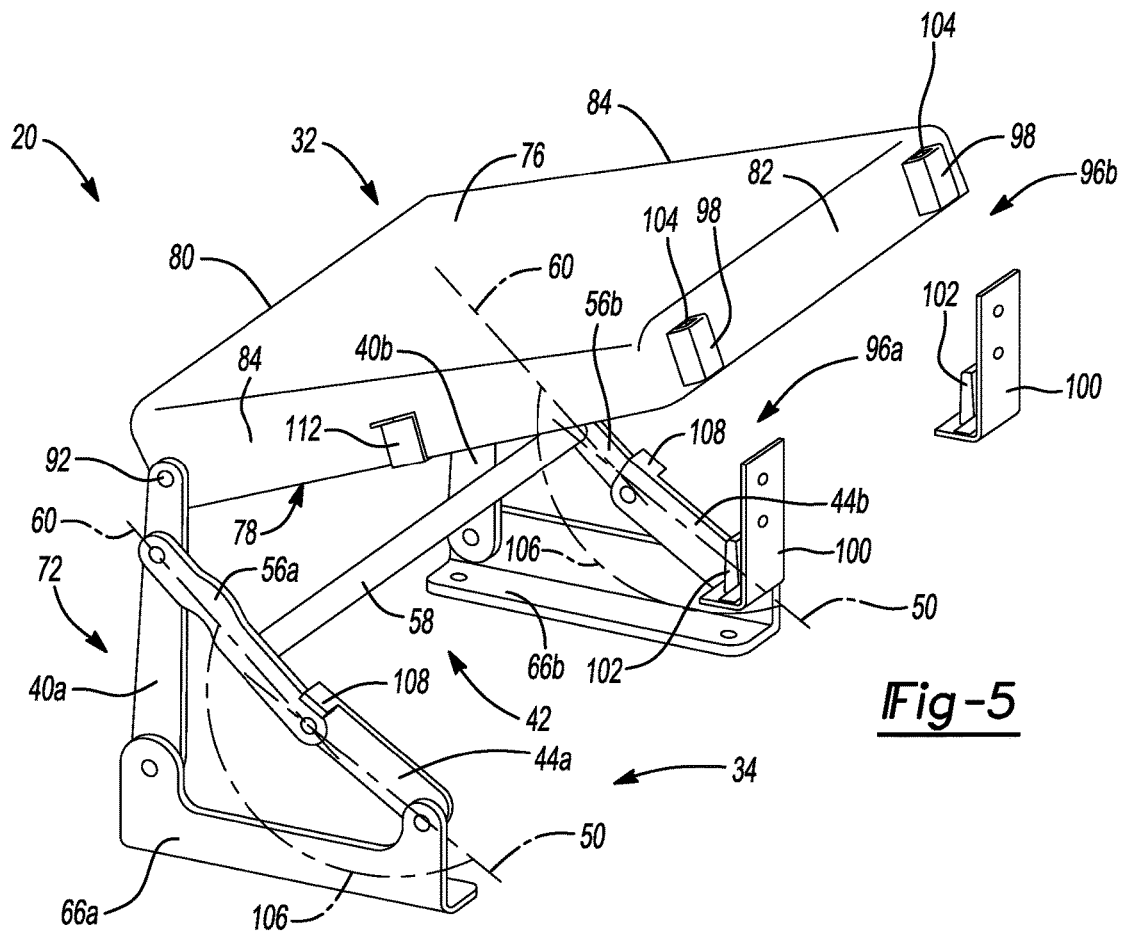
FIG. 5 is a rear perspective view of the seat bottom, linkage assembly, and rear seat bottom support assemblies of the exemplary vehicle seat assembly illustrated in FIG. 1.

With reference to FIGS. 1 and 5, the first and second upper link members 56a, 56b and the first and second lower links 44a, 44b may be configured to have an over-center arrangement when the seat bottom 32 is in the deployed position. In the over-center arrangement, an angle 106 is defined between the upper link axis 60 of the first and second upper link members 56a, 56b and the lower link axis 50 of the first and second lower links 44a, 44b. The angle 106 is greater than 180 degrees. The angle 106 has an arc, which sweeps below the first and second upper link members 56a, 56b and the first and second lower links 44a, 44b and therefore intersects one of the first and second floor brackets 66a, 66b. Gravity causes the first and second upper link members 56a, 56b and the first and second lower links 44a, 44b to rotate into the over-center arrangement, which locks the seat bottom 32 securely in the deployed position.

As best seen in FIGS. 2 and 5, each of the first and second lower links 44a, 44b has a stop 108 that contacts one of the first and second upper link members 56a, 56b when the seat bottom 32 is in the deployed position to define the angle 106 of the over-center arrangement and prevent further rotation of the upper link assembly 42 relative to the first and second lower links 44a, 44b. Optionally, each of the stops 108 may have a first adjustment screw 110 that is threadably engaged with the stop 108 and rotatable to adjust the angle 106 of the over-center arrangement. It should also be appreciated that other configurations are possible. For example, a single stop on only one of the first and second lower links 44a, 44b may be provided. The stop 108 may also be positioned at a different location or positioned on a different component of the linkage assembly 34.

As best seen in FIGS. 2-5, the vehicle seat assembly 20 may also include at least one downstop 112 disposed along one of the seat bottom sides 84 that is attached to the frame 86 of the seat bottom 32. The downstop 112 is positioned to contact one of the first and second primary support links 40a, 40b when the seat bottom 32 is in the stowed position to align the underside surface 78 of the seat bottom 32 with the floor 26 of the cargo area 24 and prevent the seat bottom 32 from lowering further into the depression 94. Optionally, the at least one downstop 112 may have a second adjustment screw 114 that is threadably engaged with the downstop 112 and rotatable to raise or lower the underside surface 78 of the seat bottom 32 relative to the floor 26 of the cargo area 24. It should be appreciated that the stops 108 on the first and second upper link members 56a, 56b and the downstop 112 on the seat bottom 32 may be constructed in a number of different ways. For example, in the illustrated embodiment, the stops 108 and the downstop 112 are constructed as a tab that has an L-shaped cross-section.

Figure 6:
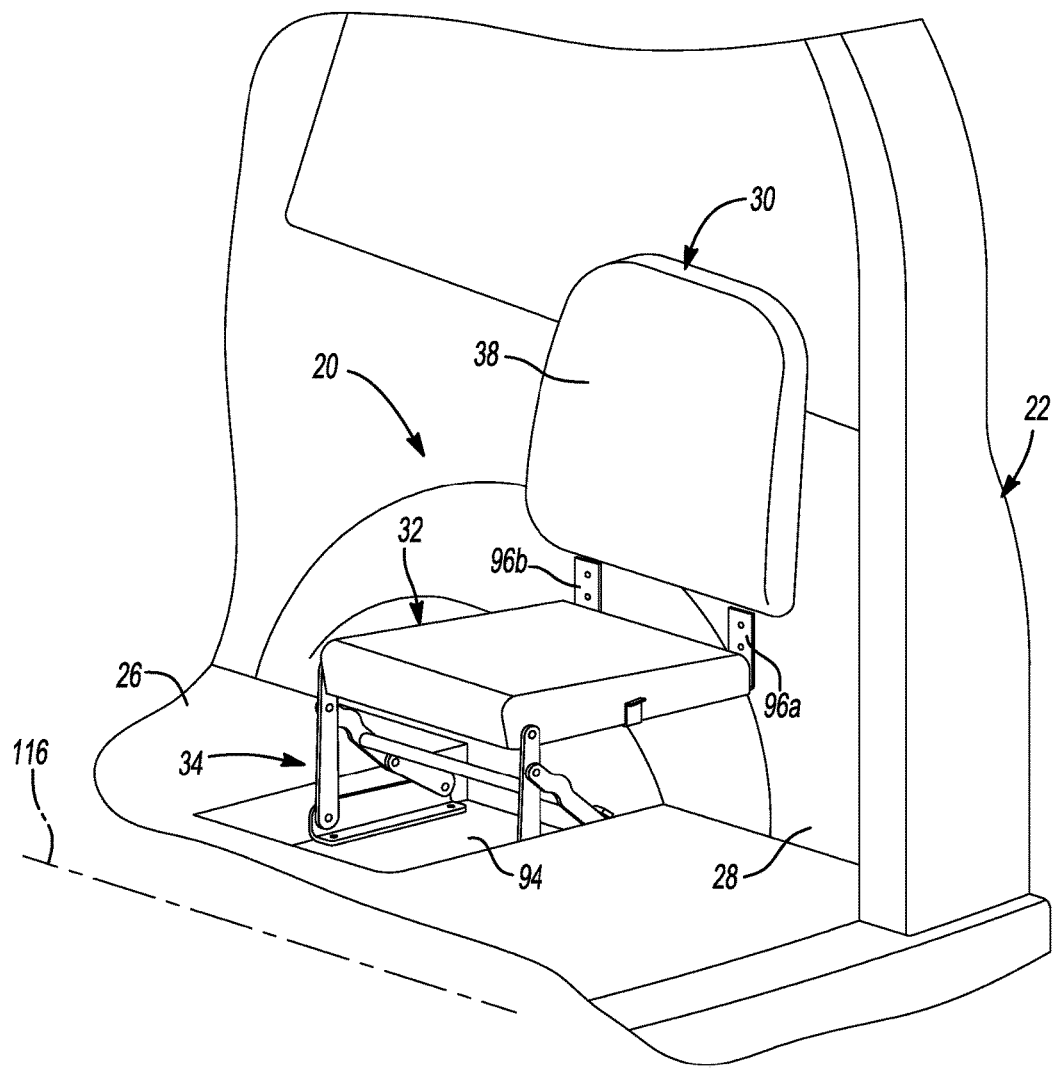
FIG. 6 is a front perspective view of the exemplary vehicle seat assembly illustrated in FIG. 1 where the seat back is mounted to a side quarter panel of a vehicle.

FIGS. 6-8 show the vehicle seat assembly 20 installed in various vehicles 22. In FIGS. 6-7, the vehicle 22 is an automobile and specifically a sport utility vehicle (SUV); however, the subject disclosure is not intended to be limited to seat assemblies for sport utility vehicles. By way of example and without limitation, the disclosed vehicle seat assembly 20 may be used in pickup trucks (FIG. 8), vans, mini-vans, cars, cross over vehicles, commercial vehicles, cargo transport vehicles, buses, military trucks, emergency vehicles, off-road vehicles, recreational vehicles (i.e., mobile homes), planes, helicopters, trains, and boats. It should also be appreciated that multiple vehicle seat assemblies 20 may be installed next to one another along the wall 28 of the vehicle 22. For example, multiple vehicle seat assemblies 20 may be installed next to one another in a commercial vehicle such that the commercial vehicle is configured as a bus when the vehicle seat assemblies 20 are in the deployed position and a cargo transport vehicle when the vehicle seat assemblies 20 are in the stowed position.

In the exemplary embodiment shown in FIG. 6, the occupant facing surface 38 of the seat back 30 faces a centerline 116 of the vehicle 22 and the wall 28 extends along a side quarter panel of the vehicle 22. In the alternative embodiments shown in FIGS. 7 and 8, the occupant facing surface 38 of the seat back 30 faces a forward end of the vehicle 22 and the wall 28 extends along a rear lift-gate (FIG. 7), rear swing-gate, or a rear tail-gate (FIG. 8) of the vehicle 22. It should be appreciated that these embodiments are provided as examples and are not intended to be limiting.

A method of operating the vehicle seat assembly 20 set forth above will now be described. The method begins with the steps of positioning the seat bottom 32 in a deployed position (FIG. 3A) with the occupant support surface 76 facing up and the rear seat bottom end 82 located adjacent to the wall 28 of the cargo area 24. The method proceeds with the steps of rotating the upper link assembly 42 up towards the underside surface 78 of the seat bottom 32 and rotating the seat bottom 32 relative to the first and second primary support links 40a, 40b (FIG. 3B) until the underside surface 78 of the seat bottom 32 faces up and the front seat bottom end 80 is positioned closer to the wall 28 of the cargo area 24 than the rear seat bottom end 82. The method continues with the step of lowering the seat bottom 32 into a depression 94 in the floor 26 of the cargo area 24 to place the seat bottom 32 in a stowed position (FIG. 3C) where the underside surface 78 of the seat bottom 32 forms part of the floor 26 of the cargo area 24. The method may further include the steps of lifting the seat bottom 32 up away from the depression 94 in the floor 26 of the cargo area 24 and rotating the seat bottom 32 relative to the first and second primary support links 40a, 40b until the occupant support surface 76 of said seat bottom 32 faces up and the rear seat bottom end 82 is positioned adjacent to the wall 28 of the cargo area 24. In accordance with these two steps, the seat bottom 32 is brought back to the deployed position (FIG. 3A). When this occurs, gravity rotates the upper link assembly 42 down away from the underside surface 78 of the seat bottom 32, which locks the first and second upper link members 56a, 56b and the first and second lower links 44a, 44b in an over-center arrangement. The method may further include the step of rotating the rear seat bottom end 82 towards the wall 28 of the cargo area 24 until at least part of the wall bracket 100 is received by the receiver 98 on the rear seat bottom end 82 to releasably connect the rear seat bottom end 82 to the wall 28 of the cargo area 24. When it is desired to move the seat bottom 32 from the deployed position back to the stowed position, the wall bracket 100 is released from the receiver 98 on the rear seat bottom end 82 as the rear seat bottom end 82 is rotated up and away from the wall 28 of the cargo area 24 (FIG. 3B).

Many modifications and variations of the disclosed vehicle seat assembly 20 and associated method of operation are possible in light of the above teachings and may be practiced otherwise than as specifically described while within the scope of the appended claims. These antecedent recitations should be interpreted to cover any combination in which the inventive novelty exercises its utility. With respect to the methods set forth herein, the order of the steps may depart from the order in which they appear without departing from the scope of the present disclosure and the appended method claims. Additionally, various steps of the method may be performed sequentially or simultaneously in time.

What is claimed is:

1. A vehicle seat assembly comprising:
a seat back;
a linkage assembly;
a seat bottom mounted to said linkage assembly and moveable between a stowed position and a deployed position;
said seat bottom defining a deployed seat bottom plane when said seat bottom is in said deployed position and said seat bottom being positioned below said deployed seat bottom plane when said seat bottom is in said stowed position; and
said seat bottom being separate and spaced away from said seat back when said seat bottom is in said stowed position, wherein said linkage assembly includes first and second primary support links, an upper link assembly that is pivotally connected to said first and second primary support links, and first and second lower links that are pivotally connected to said upper link assembly, said upper link assembly including first and second upper link members and a torque tube extending between said first and second upper link members that couples rotation of said first and second upper link members, said first primary support link and said first lower link being pivotally connected to a first floor bracket such that said first primary support link, said first upper link member, said first lower link, and said first floor bracket collectively form a first four-bar linkage, and said second primary support link and said second lower link being pivotally connected to a second floor bracket such that said second primary support link, said second upper link member, said second lower link, and said second floor bracket collectively form a second four-bar linkage.

2. The vehicle seat assembly set forth in claim 1, wherein each of said first and second lower links have and extend along a lower link axis and each of said first and second upper link members have and extend along an upper link axis and wherein said first and second upper link members and said first and second lower links have an over-center arrangement when said seat bottom is in said deployed position where an angle between said upper link axis of said first and second upper link members and said lower link axis of said first and second lower links is greater than 180 degrees, said angle having an arc that intersects one of said first and second floor brackets.

3. The vehicle seat assembly set forth in claim 2, wherein said first and second lower links each has a stop that contacts one of said first and second upper link members when said seat bottom is in said deployed position to define said angle of said over-center arrangement and prevent further rotation of said upper link assembly relative to said first and second lower links.

4. A vehicle seat assembly comprising:
a seat back;
a linkage assembly;
a seat bottom mounted to said linkage assembly and moveable between a stowed position and a deployed position;
said seat bottom defining a deployed seat bottom plane when said seat bottom is in said deployed position and said seat bottom being positioned below said deployed seat bottom plane when said seat bottom is in said stowed position; and
said seat bottom being separate and spaced away from said seat back when said seat bottom is in said stowed position, wherein said seat back is not supported by or directly connected to said seat bottom or said linkage assembly and wherein said seat back remains above said deployed seat bottom plane when said seat bottom is in said deployed position and when said seat bottom is in said stowed position.

5. A vehicle seat assembly for a vehicle having a cargo area bounded by a floor and a wall, said vehicle seat assembly comprising:
a seat back adapted to mount to the wall of the cargo area;
a linkage assembly adapted to mount to the floor of the cargo area, wherein said linkage assembly includes first and second primary support links, an upper link assembly that is pivotally connected to said first and second primary support links, and first and second lower links that are pivotally connected to said upper link assembly, said upper link assembly including first and second upper link members and a torque tube extending between said first and second upper link members that couples rotation of said first and second upper link members;
a seat bottom mounted to said linkage assembly and moveable between a stowed position and a deployed position;
said seat bottom defining a deployed seat bottom plane when said seat bottom is in said deployed position and said seat bottom being positioned below said deployed seat bottom plane when said seat bottom is in said stowed position; and
said seat bottom being separate from said seat back and said seat bottom being spaced apart from said seat back when said seat bottom is in said stowed position.

6. The vehicle seat assembly set forth in claim 5, wherein said seat bottom includes an occupant support surface, an underside surface opposite said occupant support surface, a frame, a seat bottom cushion supported by said frame, a front seat bottom end, a rear seat bottom end, and a pair of seat bottom sides extending between said front seat bottom end and said rear seat bottom end.

7. The vehicle seat assembly set forth in claim 5, wherein said first and second primary support links are pivotally connected to said frame at said pair of seat bottom sides, adjacent to said front seat bottom end, such that said rear seat bottom end is located adjacent to the wall of the cargo area with said occupant support surface facing up when said seat bottom is in said deployed position and said seat bottom is free to rotate relative to said first and second primary support links when said seat bottom is moved to said stowed position such that said front seat bottom end is closer to the wall of the cargo area with said underside surface of said seat bottom facing up when said seat bottom is in said stowed position.

8. The vehicle seat assembly set forth in claim 7, wherein said seat bottom is adapted to be at least partially received in a depression in the floor of the cargo area when said seat bottom is in said stowed position.

9. The vehicle seat assembly set forth in claim 8, wherein said underside surface of said seat bottom is adapted to be positioned in-plane with the floor of the cargo area when said seat bottom is in said stowed position such that said underside surface of said seat bottom forms part of the floor of the cargo area when said seat bottom is in said stowed position.

10. The vehicle seat assembly set forth in claim 9, wherein at least one of said seat bottom sides has a downstop that is attached to said frame and that contacts one of said first and second primary support links when said seat bottom is in said stowed position to align said underside surface of said seat bottom with the floor of the cargo area and prevent said seat bottom from lowering further into said depression.

11. A vehicle seat assembly for a vehicle having a cargo area bounded by a floor and a wall, said vehicle seat assembly comprising:
a seat back adapted to mount to the wall of the cargo area;
a linkage assembly adapted to mount to the floor of the cargo area;
a seat bottom mounted to said linkage assembly and moveable between a stowed position and a deployed position;
said seat bottom defining a deployed seat bottom plane when said seat bottom is in said deployed position and said seat bottom being positioned below said deployed seat bottom plane when said seat bottom is in said stowed position;
said seat bottom being separate from said seat back and said seat bottom being spaced apart from said seat back when said seat bottom is in said stowed position, wherein said seat bottom includes an occupant support surface, an underside surface opposite said occupant support surface, a frame, a seat bottom cushion supported by said frame, a front seat bottom end, a rear seat bottom end, and a pair of seat bottom sides extending between said front seat bottom end and said rear seat bottom end; and
at least one rear seat bottom support assembly adapted to releasably connect said rear seat bottom end to the wall.

12. The vehicle seat assembly set forth in claim 11, wherein said at least one rear seat bottom support assembly includes a receiver positioned along said rear seat bottom end that is connected to said frame and a wall bracket adapted to be mounted to the wall of the cargo area below said seat back, said wall bracket having a bayonet extending upwardly from said bracket toward said seat back, and said receiver having a receptacle that receives said bayonet when said seat bottom is in said deployed position.

13. The vehicle seat assembly set forth in claim 11, wherein said at least one rear seat bottom support assembly includes a latch mechanism.

14. A vehicle seat assembly for a vehicle having a cargo area bounded by a floor and a wall, said vehicle seat assembly comprising:
a seat back adapted to mount to the wall of the cargo area;
a linkage assembly adapted to mount to the floor of the cargo area;
a seat bottom mounted to said linkage assembly and moveable between a stowed position and a deployed position;
said seat bottom defining a deployed seat bottom plane when said seat bottom is in said deployed position and said seat bottom being positioned below said deployed seat bottom plane when said seat bottom is in said stowed position;
said seat bottom being separate from said seat back and said seat bottom being spaced apart from said seat back when said seat bottom is in said stowed position, wherein the wall is a side quarter panel of the vehicle, wherein said seat back includes a backside surface that is adapted to face the wall of the cargo area and an occupant facing surface opposite said backside surface, and wherein said seat back is arranged such that said occupant facing surface of said seat back faces a centerline of the vehicle.

15. A vehicle seat assembly for a vehicle having a cargo area bounded by a floor and a wall, said vehicle seat assembly comprising:
a seat back adapted to mount to the wall of the cargo area;
a linkage assembly adapted to mount to the floor of the cargo area;
a seat bottom mounted to said linkage assembly and moveable between a stowed position and a deployed position;
said seat bottom defining a deployed seat bottom plane when said seat bottom is in said deployed position and said seat bottom being positioned below said deployed seat bottom plane when said seat bottom is in said stowed position;
said seat bottom being separate from said seat back and said seat bottom being spaced apart from said seat back when said seat bottom is in said stowed position, wherein the wall is one of a rear lift-gate, rear swing-gate, and a rear tail-gate of the vehicle, wherein said seat back includes a backside surface that is adapted to face the wall of the cargo area and an occupant facing surface opposite said backside surface, and wherein said occupant facing surface of said seat back faces a forward end of the vehicle.

16. A method of operating a vehicle seat assembly in a vehicle having a cargo area bounded by a floor and a wall, the vehicle seat assembly comprising a seat back mounted to the wall of the cargo area, a linkage assembly mounted to the floor of the cargo area, and a seat bottom mounted to the linkage assembly, where the linkage assembly includes first and second primary support links, an upper link assembly pivotally connected to the first and second primary support links, and first and second lower links pivotally connected to the upper link assembly, and where the seat bottom includes an occupant support surface, an underside surface opposite the occupant support surface, a front seat bottom end, and a rear seat bottom end, the method comprising the steps of:
positioning the seat bottom in a deployed position with the occupant support surface facing up and the rear seat bottom end located adjacent to the wall of the cargo area;
rotating the upper link assembly up towards the underside surface of the seat bottom;

rotating the seat bottom relative to the first and second primary support links until the underside surface of the seat bottom faces up and the front seat bottom end is closer to the wall of the cargo area than the rear seat bottom end; and lowering the seat bottom into a depression in the floor of the cargo area to place the seat bottom in a stowed position where the underside surface of the seat bottom forms part of the floor of the cargo area.

17. The method of operating a vehicle seat assembly set forth in claim 16, further comprising the steps of:

lifting the seat bottom up away from the depression in the floor of the cargo area; and rotating the seat bottom relative to the first and second primary support links until the occupant support surface of the seat bottom faces up and the rear seat bottom end is positioned adjacent to the wall of the cargo area to position the seat bottom in the deployed position, wherein gravity rotates the upper link assembly down away from the underside surface of the seat bottom when the seat bottom is rotated to the deployed position.

18. The method of operating a vehicle seat assembly set forth in claim 17, wherein the vehicle seat assembly has a rear seat bottom support assembly that includes a wall bracket and a receiver mounted to the rear seat bottom end and wherein the method further comprising the step of:

rotating the rear seat bottom end towards the wall of the cargo area until at least part of the wall bracket is received by the receiver on the rear seat bottom end to releasably connect the rear seat bottom end to the wall of the cargo area.

\* \* \* \* \*